Oct. 31, 1944.  A. H. CANDEE  2,361,599
METHOD OF AND APPARATUS FOR CUTTING GEARS
Filed Dec. 16, 1940  4 Sheets-Sheet 1

Inventor
ALLAN H. CANDEE
By
Attorney

Oct. 31, 1944.    A. H. CANDEE    2,361,599
METHOD OF AND APPARATUS FOR CUTTING GEARS
Filed Dec. 16, 1940    4 Sheets-Sheet 2

Inventor
ALLAN H. CANDEE
By B. E. Schlesinger
Attorney

Inventor
ALLAN H. CANDEE

Patented Oct. 31, 1944

2,361,599

UNITED STATES PATENT OFFICE 2,361,599

METHOD OF AND APPARATUS FOR CUTTING GEARS

Allan H. Candee, Rochester, N. Y., assignor to Gleason Works, Rochester, N. Y., a corporation of New York Application December 16, 1940, Serial No. 370,285

8 Claims. (Cl. 90—6)

The present invention relates to the production of gears and particularly to the cutting of bevel and hypoid gears in a continuous indexing process with reciprocating planing tools.

It is usually desirable that bevel and hypoid gears have a localized tooth bearing, that is, that they mesh with less than full length tooth contact. Such gears are able to accommodate themselves readily to the variations in mountings and loads that are encountered in use. In fact, the advantages of a localized tooth bearing have been so completely demonstrated in practice that today a localized tooth bearing or so-called "crowned" form of tooth is coming more and more into use even in the spur gear field.

Because of difficulties in machine design, ordinarily machines for cutting tapered gears in a continuous indexing process are constructed to use but a single planing tool at a time. The gear blank is first roughed and then the two sides of the teeth of the blank are separately finished.

Machines for cutting tapered gears in a continuous indexing process with two planing tools have been proposed and some have been built. None of them, however, have ever gone into extensive use.

It is preferable, of course, where two planing tools are employed, to design the machine so that the tools will cut alternately, one tool taking its cutting stroke while the other tool is on its return idle stroke. This balances the operation of the machine and keeps the cutting thrusts at a minimum.

In a planing machine of the intermittent indexing type, it is possible to use a single simple crank to operate two planing tools and have them cut alternately because in an intermittent indexing type of machine, the tooth shape is dependent solely on the direction of the tool stroke, not on the velocity of the stroke. In a continuous indexing type of machine, however, the tooth shape is determined in part by the velocity of movement of the tool. The lengthwise tooth shape produced on the gear is a resultant of the tool motion and of the continuous rotation of the work. A single simple crank cannot be used, therefore, in a continuous indexing type machine to drive two tool slides and have the tools cut alternately, for a simple crank will impart a different movement during one half of a revolution from that which it produces during the other half of a revolution, and one tool would on its cutting stroke cut a different lengthwise curve from that produced by the other tool on its cutting stroke. Of course, the crank motion can be modified to overcome this difficulty, or two cranks can be used, one for each tool, or a cam may be employed, but all of these alternate designs introduce complications into the machine construction.

Machines of the continuous indexing type have been built with two tools mounted on separate slides which are actuated from a single crank to cut simultaneously. Such machines have the drawback, however, that they must be run at relatively slow speed for finish cutting. Otherwise vibration and chatter are bound to be set up by the impact of the two tools simultaneously against the blank. Moreover, no satisfactory practical method has been devised up to the present time for operating such machines in a way to obtain a localized tooth bearing on the sides of the teeth being cut. In the continuous indexing process, where two tools are cutting simultaneously, the blank is rotating into one tool as it cuts and the blank is rotating away from the other tool as it cuts. Hence, separate means would have to be provided to modify the motions of the two individual tools in order to produce a suitable localization of bearing on the sides of the teeth cut by the two tools.

One purpose of the present invention is to provide a method and apparatus for cutting tapered gears in a continuous indexing process in which two tools may be employed but which will be simple and in which a single actuating means may be used to effect the cutting strokes of the two tools.

Another object of the invention is to provide a method and apparatus for cutting a gear in a continuous indexing process with tooth surfaces suitable to mesh with a mate gear having longitudinally straight teeth.

A further purpose of the present invention is to provide a method and apparatus of the continuous indexing type in which two planing tools may be employed to cut opposite sides of the teeth of a gear and in which the two sides may be cut to have a localized tooth bearing when the gear is run in mesh with its mate.

Another object of the invention is to provide a method and apparatus with which the tooth spaces of a gear may be roughed out and the opposite sides of the teeth finish-cut in a single operation in a single setup of a planing type continuous indexing machine.

Other objects of the invention will be apparent hereinafter from the specification and from the recital of the appended claims.

With the process of the present invention, a single tool slide may be used. Hence, the machine may be just as simple in construction as conventional single-tool planing machines of the continuous indexing type. In fact, machines of conventional design may be employed for practicing the present invention by simply substituting for the known type tool holder, a new tool holder having tools mounted therein in accordance with the principle of the present invention.

The present invention is based on the fact that, if two planing tools are mounted in fixed relative positions so that one precedes the other in the direction of cut and are moved simultaneously together, they will travel in similar paths relative to a continuously rotating gear blank, but will cut different lengthwise curves on the opposite sides of the teeth of the blank because the tools will engage the blank successively and will be traveling in different parts of their paths when they are cutting. By properly determining the longitudinal distance between the tools, then, suitable portions of the paths of relative lengthwise movement of the tools can be used for the cutting portions of the tool strokes.

Thus tools which are crank actuated cut in sinusoidal paths relative to a continuously rotating gear blank, that is, a crank-actuated tool moves on a path which is curved in one direction for part of the cutting stroke of the tool and which is curved in the opposite direction for the remainder of the cutting stroke. By properly spacing the two tools, which cut opposite sides of the teeth, longitudinally from one another, then, both tools may be made to cut convex tooth surfaces on both sides of the teeth, thus producing a crown effect on each side of a tooth and giving the tooth a suitable localization of bearing.

The invention is not confined to a machine in which the tools are crank-actuated but the principles apply where the tools are cam-actuated or are operated by any other suitable means. For finish cutting, only two tools need be employed, one for cutting each side of the tooth. For rough-cutting, however, it may be desirable to employ a third tool. This third tool may take the stock out of the bottom of the tooth space of the blank and leave the two side-cutting tools to finish the sides of the blank. The third tool may project in the direction of the tooth depth beyond the two side cutting tools and may be made with sides of smaller pressure angle than the corresponding sides of the side-cutting tools so that it will cut primarily as a bottom-cutting tool, leaving the side cuts to be taken principally by the side-cutting tools. Any other suitable arrangement and construction may be employed also, of course.

Figure 1:
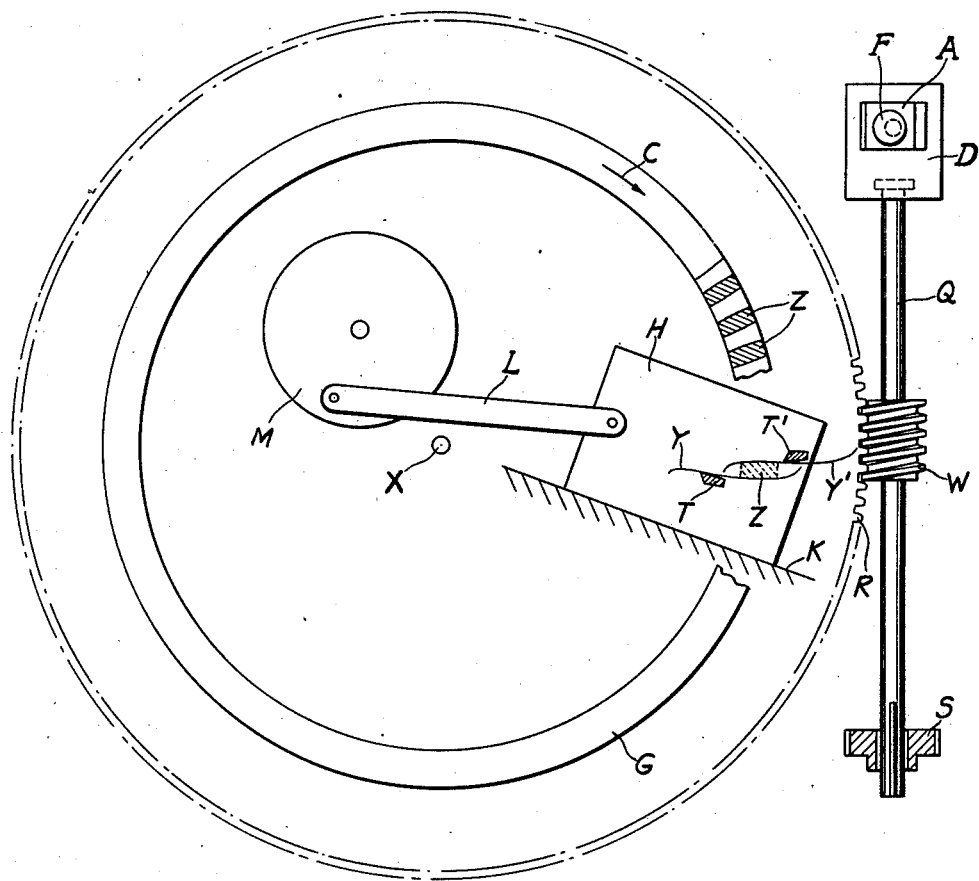
Fig. 1 is a diagrammatic view illustrating the principle of the present invention and showing the paths traced relative to a continuously rotating gear blank by two side cutting tools when these tools are mounted on the same slide and that slide is crank actuated.

Fig. 1 illustrates diagrammatically one way in which the present invention may be practiced on a planing generator of the continuous indexing type constructed according to the joint patent of the present inventor and one Magnus H. Johanson, No. 1,616,439 granted February, 8, 1927. In this machine there is a single tool slide and a single cutting tool is mounted thereon. The slide is reciprocated by a crank and the work is rotated continuously at a uniform velocity. The slide is mounted upon a cradle which is oscillated by an eccentric in time with the movement of the tool slide so as to enable the tool to cut a lengthwise tooth shape of uni-directional curvature. This eccentric may or may not be employed in the present invention. For generating gears, the cradle and work are rotated in timed relation. These rotary motions of cradle and work are in addition to the other relative motions imparted to the tool and work.

In Fig. 1, the gear blank to be cut is denoted as G. The tool slide of the machine is denoted as H, and the crank and connecting rod for reciprocating the tool slide are denoted as M and L, respectively. Heretofore but one tool at a time has been used on the machine of the patent named. With the present invention, however, two or more tools are used simultaneously, all being mounted on the tool slide. In the embodiment illustrated in Fig. 1, there are two tools T and T' mounted on the tool slide H and these two tools are sharpened to cut, respectively, on opposite side surfaces of the teeth of the gear blank. The two tools T and T' are spaced longitudinally and laterally from one another.

Because the tool slide H is reciprocated at a varying velocity by the crank M and connecting rod L, and the blank G is rotated continuously at a uniform velocity, each tool will move in a sinusoidal path relative to the gear blank. While the paths of movement of the two tools will be similar in shape, they will be nevertheless spaced longitudinally and laterally from one another because of the longitudinal and lateral spacing of the two tools on the slide H. Thus the tool T will move in sinusoidal path Y relative to the gear blank, while the tool T' will move in a sinusoidal path Y'. By suitably selecting the relative longitudinal positions of the two tools, then, it is possible to use any desired parts of their paths during actual cutting.

In Fig. 1 the tool slide H is shown so positioned angularly about the axis X of the cradle of the machine and the direction C of rotation of the work is so chosen that teeth will be cut on the gear blank which are substantially straight and which have their median lines extending radially of the apex of the blank. Here the tools, T and T' are shown so spaced longitudinally and laterally from one another, that when the tool T is cutting the underside of a tooth of the gear, it will cut a longitudinally convex surface on the underside of a gear tooth and that when the tool T' is cutting, it will cut a longitudinally convex surface on the upper side of a gear tooth.

Thus the two tools T and T' arranged on the same slide and cutting on the same stroke will produce longitudinally convex tooth surfaces on the opposite sides of the teeth of a gear, thus not only cutting two sides of the teeth in one setup but cutting those two sides with a crowned tooth bearing.

The teeth Z so cut on the gear G will readily mesh with the teeth of a mate straight toothed gear with localized tooth contact. This is a further advantage of the present invention because heretofore if it was desired to cut a straight bevel gear on a continuous indexing type planing generator, the teeth could only be cut approximately straight. Their sides would have a very slight lengthwise curvature, but this curvature would be slightly convex on one side of the teeth and slightly concave on the opposite side. Hence the gear would only run properly with a mate which was also cut on a continuous indexing type planing generator. A gear cut by the method of the present invention may be meshed, however, with a mate straight toothed gear cut by any suitable process for producing the latter gear.

In the machine of the Candee et al. Patent No. 1,616,439 above referred to, there is an eccentric F provided which rotates in a block A that slides in a head D. This head is connected to the worm shaft Q which carries a worm W. The worm W meshes with a wormwheel R which is secured to the cradle of the machine. The eccentric is provided to permit modifying the sinusoidal tooth shape so as to cause the tool to move along a unidirectional curve if desired. The eccentric may or may not be employed when cutting gears according to the present invention, as is desired. The eccentric, when used, is driven in time with the crank through the mechanism described in the Candee et al. patent.

The present invention may be practiced in cutting gears either with or without generating roll. When a generating roll is employed, timed rotational movements are imparted to both the cradle and the work for the purpose of generating the tooth profiles of the work and these motions are superimposed on the other movements of these parts. Thus, for the purpose of effecting generating roll of the cradle, the worm W is rotated in time with the work through a gear S which has a splined connection with the shaft Q. Where the blank is being generated, the generating roll suffices to feed the tools into the blank. If the gear is being cut without generation, a depthwise feed movement is provided in order to cut teeth to the proper depth.

Figure 2:
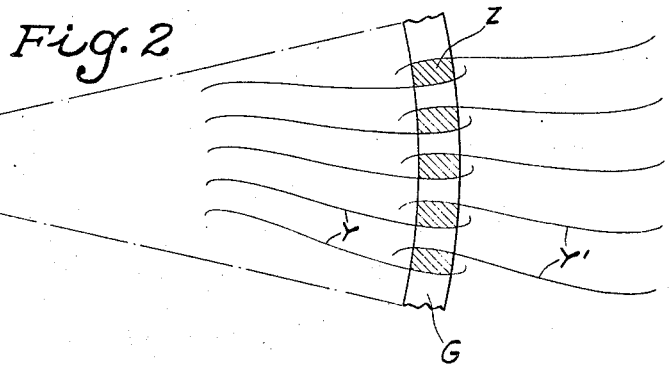
Fig. 2 is a diagrammatic view on an enlarged scale further showing the paths traced by the two tools during their cutting strokes.

Fig. 2 further illustrates how the sinusoidal curves with their normally objectionable reversal in curvature are used to advantage in the process of the present invention to permit cutting in one setup opposite sides of the teeth of a gear blank with localized tooth bearing. Here several teeth Z of the gear G are shown and here again the lines Y and Y', denote, respectively, paths of movements of the two cutting tools T and T', respectively, on successive cutting strokes of these tools. It will be understood that the blank is rotating continuously, that the tools cut on their strokes in one direction only and are withdrawn on their return strokes, and that due to the continuous rotation of the blank, the tools enter different tooth spaces of the blank on successive cutting strokes. As will be clear, in the embodiment illustrated only that portion of the cutting stroke of each tool is used which will enable the tool to cut a convex tooth surface on the gear blank.

Figure 3:
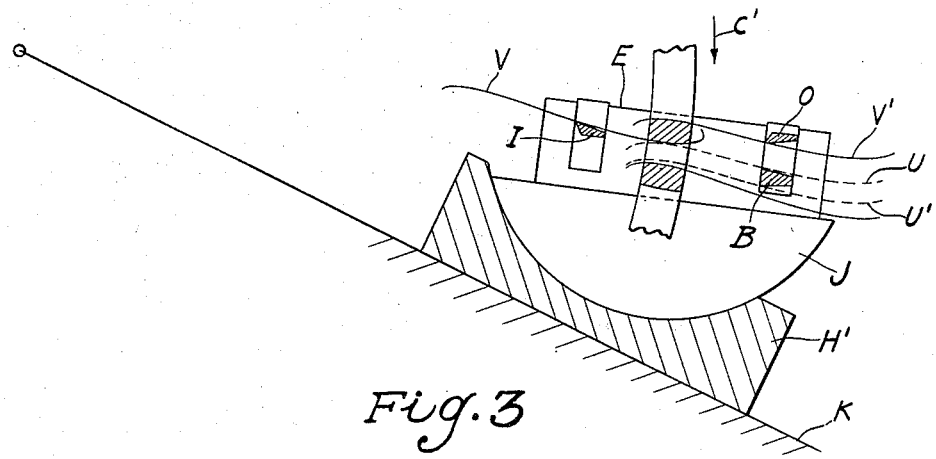
Fig. 3 is an enlarged diagrammatic view showing the effect of mounting a third, bottom-cutting tool on the same slide as the two side-cutting tools.

Fig. 3 shows how the method of the present invention may be applied to the roughing of the tooth spaces of a gear or to the completing of these tooth spaces from the solid. Here there are three cutting tools mounted on the single tool slide H'. Two of the tools may be side-cutting tools I and O, which are similar to the tools T and T' and which are sharpened to cut on opposite sides of a tooth, respectively. The third tool B is of narrower point width than the width of the tooth slot to be cut by the tools I and O and is intended to take out stock from the bottom of the tooth slots of the gear to reduce the amount of stock that has to be removed by the side cutting tools I and O.

A little more of the construction of the tool slide is illustrated diagrammatically in Fig. 3 than in Fig. 1. The tools I, O and B are themselves mounted in the tool block E and this tool block is in turn mounted on a support J. The support J is angularly adjustable on the tool slide H' so as to permit adjusting the tool to obtain the proper tool clearance angle.

Now it will be seen that when the slide H' is reciprocated by the crank and connecting rod, the tools I, O and B will move together and that the side cutting edges of each of these tools will trace sinusoidal curves. Thus the side-cutting edge of the tool I will trace the curve V, the side-cutting edge of the tool O will trace the sinusoidal curve V', and the opposite side-cutting edges of the tool B will trace the sinusoidal curves U and U', respectively. Because the point-width of the tool B is less than the effective point width of the tools I and O, the tool B will not cut the full width of the tooth slot of the blank but will leave stock on the sides of the teeth to be removed by the tools I and O. The tool B removes stock as indicated between the lines U and U' only.

In the arrangement illustrated, the tool B cuts in the same tooth slot with the tool I on each cutting stroke of the slide H', and the tool O cuts in the next adjacent tooth slot. On each successive cutting stroke of the slide H', however, the tools I and B enter the tooth slot which has previously been operated upon by the tool O, and as the blank revolves, the tool O also enters the tooth slots through which the tools I and B have previously passed, so that all of the tooth slots are roughed out and have their sides thereof formed simultaneously.

Preferably the tool B is made of sufficient height to project in the direction of tooth depth beyond the tools I and O. Further than this the opposite side cutting edges 10 and 11 (Fig. 4) of the tool B are preferably made of smaller pressure angle, that is, less inclination, than the corresponding side-cutting edges 12 and 13, respectively, of the tools O and I.

Figure 4:
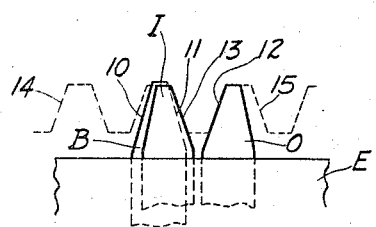
Fig. 4 is a diagrammatic view further illustrating the relative positions of the bottom and side-cutting tools of the combination shown in Fig. 3.

Fig. 4 is a diagrammatic view looking at the tools from the front end of the tool slide and shows how the side-cutting edges 12 and 13 of the blades O and I may represent opposite sides 14 and 15, respectively, of an imaginary rack or crown gear when the tools are employed in the generating operation, and so may generate tooth surfaces on the work conjugate to this rack or crown gear.

Preferably the tool B is made to project beyond the tools I and O a distance greater than the feed of the work into the tools between successive cutting strokes in the same tooth space. In this way, the tool B will cut in the bottoms of the tooth slots of the work and relieve the side tools I and O of the greater portion if not all of the bottom cutting. Because the pressure angles of the opposite side edges 10 and 11 of the tool B are less than the pressure angles of the corresponding sides 12 and 13 of the tools O and I, the tool B will cut on its sides only for the distance which it projects depthwise beyond the tools I and O plus or less the amount of feed of the work between operation of the successive tools.

Figure 6:
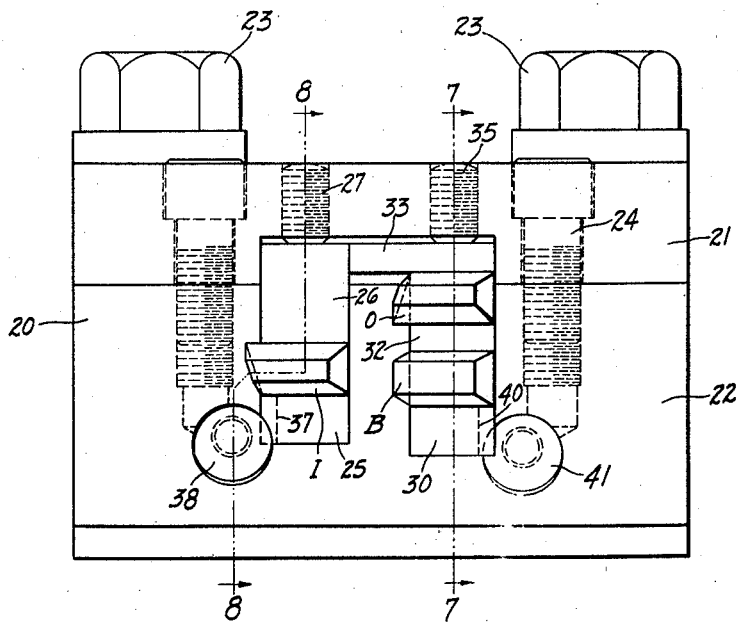
Fig. 6 is a side elevation of this tool block.
Figure 7:
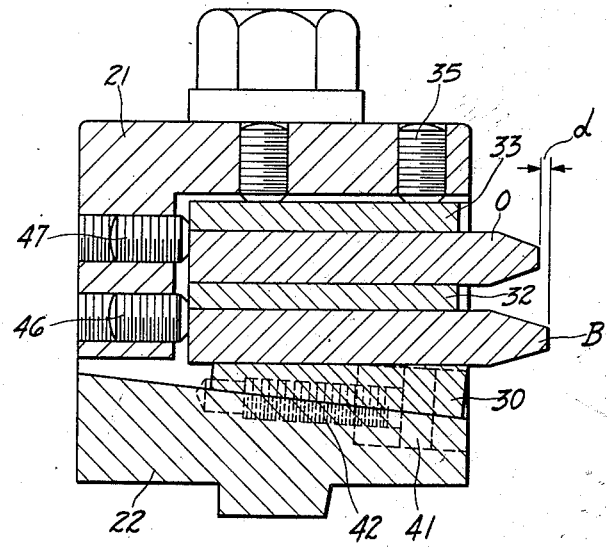
Fig. 7 is a section through the tool block taken on the line 7—7 of Fig. 6, looking in the direction of the arrows.
Figure 8:
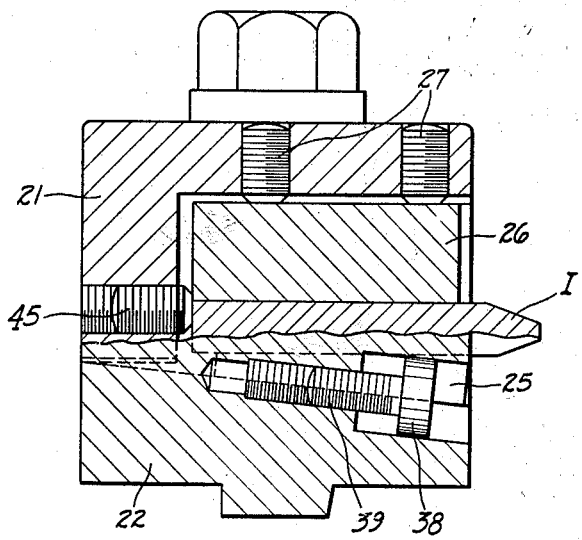
Fig. 8 is a section on the line 8—8 of Fig. 6, looking in the direction of the arrows.

As has already been stated, the present invention may be practiced by directly substituting for the single tool and tool block of the machine of the Candee et al. Patent No. 1,616,439, a tool block having a plurality of tools mounted thereon and arranged in accordance with the principles of the present invention. Figs. 6 to 8 inclusive show a tool block 20 constructed to carry two side-cutting tools and a single bottom-cutting tool for practicing the present invention. This tool block 20 is made in two parts, an upper part 21 and a lower part 22. The two parts are bolted together by screws 24. There are two parallel slots formed in the lower part 22 of the tool block and in one of these slots there is mounted a side cutting tool I. In the other slot there is mounted a bottom-cutting tool B and a side-cutting tool O. The bottom-cutting tool B is sharpened to cut on both sides, while the side-cutting tools I and O are sharpened to cut on opposite sides, respectively.

There is a wedge 25 interposed between the bottom side of the shank of the side cutting tool I and the bottom of the slot in which this tool is mounted. The upper face of this wedge is horizontal but the bottom face is inclined and the bottom of the slot, in which wedge and tool are mounted, is correspondingly inclined. A block or shim 26 is positioned in this slot above the shank of the tool I, and the tool is held in position by a pair of set screws 27 which thread into the upper portion of the tool block and which engage with the upper face of the block or shim 26.

There is a wedge 30 interposed between the lower face of the shank of the tool B and the bottom of the slot in which this tool is mounted. The upper face of this wedge is horizontal, but the lower face is inclined and the bottom of this slot is correspondingly inclined. There is a shim 32 positioned between the shanks of the two blades B and O and there is a shim 33 positioned above the tool O. This latter shim is of sufficient width to abut at one end against the shim 26 and at its opposite end against the side wall of a recess in the part 21 which is aligned with one side wall of the slot in which the tools B and O are mounted. The tools O and B are held in their slots by set screws 35 which thread into the upper portion 21 of the tool block and engage the upper face of the shim 33.

The wedge 25 has a slot or kerf 37 formed in one side and the head 38 of a screw 39 engages in this kerf. This screw 39 threads into the portion 22 of the tool block and may be rotated to adjust the wedge 25 longitudinally and thereby adjust the lateral position of the tool I. Similarly the wedge 30 is formed with a slot or kerf 40. The head 41 of a screw 42 engages in this slot or kerf so that the wedge may be adjusted longitudinally to adjust the tools B and O laterally. These adjustments are for the purpose of determining the width of the slot to be cut by the tools I and O and the lateral position of the side-cutting edges of the bottom-cutting blade relative to the corresponding side-cutting edges of the side-cutting blades I and O.

All of the tools are, of course, relieved on their side and tip surfaces back of their front faces. For adjusting the height of each of the blades, after sharpening, set screws 45, 46 and 47 are provided. These set screws thread into the upper portion 21 of the tool block 20 and engage the rear ends of the tools I, B and O, respectively, to adjust the distance which the cutting portion of each tool projects beyond the front face of the tool block. The screw 46 is also used to adjust the distance $d$ which the bottom-cutting blade B projects depthwise beyond the side-cutting blades I and O.

The distance between the two slots in which the tool I and the tools O and B, respectively, are mounted depends upon the lengthwise shape desired on the sides of the teeth of the gear to be cut and is determined by the portions of the paths of the tools where the tools are actually to cut.

Figure 5:
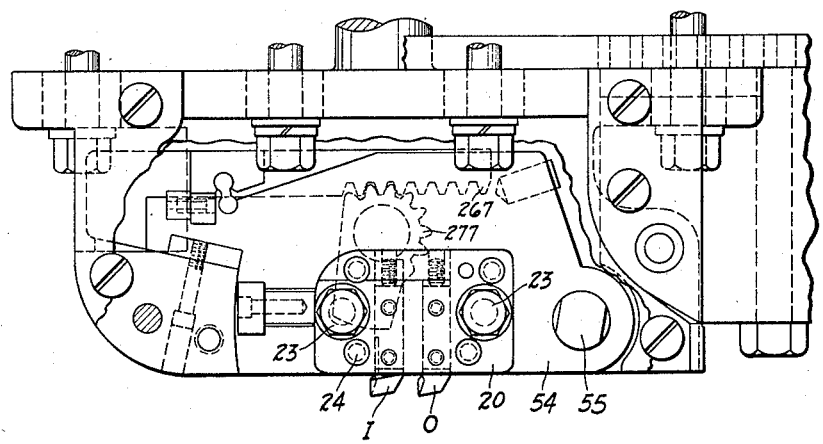
Fig. 5 is a plan view of the tool head of a known type planing generator showing a tool block mounted thereon in which is secured tools for the purpose of practicing the present invention.

As has already been stated, the machine of the Candee et al. Patent No. 1,616,439 can be employed for practicing the present invention by simply substituting a tool block with tools arranged thereon in accordance with the principles of the present invention for the tool block and the tool of the Candee et al. machine. Fig. 5 shows the tool head of the Candee et al. machine with a tool block made according to Figs. 6, 7 and 8 of the present application mounted thereon. The tool block 20 is shown secured to the clapper block 54 of this machine by the bolts 23. This clapper block is swingable about the pivot pin 55 for moving the tools to and from cutting position and the swinging motion is produced by the reciprocable rack 267 and the segment 277, the latter being connected with the clapping block in the manner described in the patent mentioned.

While the bottom tool B has been illustrated as arranged along side of the side-cutting tool O it will be understood that it might instead be arranged along side of the side-cutting blade I, or that it might have any other suitable position so long as the paths traced by the side-cutting edges of the bottom-cutting tool lie within the width of the tooth space cut by the side cutting tools. Moreover it will be understood that instead of employing a single bottom-cutting tool, two might be employed, one arranged, for instance, alongside of each of the side-cutting tools. It will be understood also, that it is not necessary to employ a bottom-cutting tool at all in the roughing operation, since the roughing may be accomplished by side-cutting tools alone. It will further be understood that for precision work, it may be desirable to rough with a set of tools comprising side-cutting and bottom-cutting tools and then to effect a subsequent finishing cut with side-cutting tools alone. If this is done, it is preferable to remove all of the roughing tools and to substitute separate finish side-cutting tools therefor. For this purpose a shim of suitable thickness may be substituted for the bottom-cutting tool B and the shim 32, or the whole roughing tool block may be removed and a tool block substituted therefor which carries finishing side-cutting tools alone. The finish side-cutting tools may be of identical construction as the roughing side-cutting tools, but simply set far enough apart laterally to cut the desired finished width of the tooth spaces of the gear. It will be further understood that either side-cutting tool may precede the other in the direction of cut provided the tool positions and motions are selected to achieve the desired lengthwise tooth shapes on the gear. Other possible arrangements of the tools will readily occur to those skilled in the art.

In general it may be said that while the invention has been described in connection with certain specific structures and specific applications thereof, it is capable of various further modifications and uses and this application is intended to cover any adaptations, uses, or embodiments of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting a gear which comprises mounting two cutting tools, which are adapted to cut on opposite sides of the tooth surfaces of a gear blank, respectively, in relatively fixed positions so that one tool precedes the other in the direction of cutting movement of the tools, reciprocating said tools together whereby they engage the blank sucessively on their cutting movements, and rotating the blank continuously on its axis, the reciprocation of the tools being so timed to the blank rotation that the tools enter a different tooth space of the blank on each cutting stroke.

2. The method of cutting a gear which comprises mounting two cutting tools, which are adapted to cut opposite side tooth surfaces of a gear blank, respectively, in relatively fixed positions so that one tool precedes the other in the direction of cut, and moving said tools together at a varying velocity of a harmonic nature across the face of a gear blank while rotating the blank continuously on its axis at a uniform velocity so that the tools travel in sinusoidal paths, the distance between the tools being so chosen that the tools cut in such parts of their sinusoidal paths as to produce longitudinally convex surfaces on opposite sides of the teeth of the blank.

3. The method of cutting a gear which comprises employing two reciprocatory cutting tools, which are adapted to cut on opposite side tooth surfaces, respectively, of a gear blank and which are adapted to cut on their strokes in one direction and to be out of cutting position on their return strokes, and mounting said tools so that one tool precedes the other in the direction of cutting movement of the tools and so that the two tools will move bodily together to cut in the same tooth space successively, and rotating the gear blank on its axis continuously at a uniform velocity while imparting reciprocatory movement to the two tools so that the tools travel similar paths relative to the blank but by their successive engagement with the blank on each cutting stroke cut along different parts of those paths, the rotation of the blank being so timed to the reciprocatory movement of the tools that the tools operate in different tooth spaces of the blank on successive strokes.

4. The method of cutting a gear which comprises employing three cutting tools, one of which is a slotting tool the other two of which are adapted to cut on opposite side tooth surfaces of a gear, respectively, mounting said tools so that the opposite side-cutting tools have relatively fixed positions and one precedes the other in the direction of cut and the slotting tool is alongside one of the side-cutting tools but is spaced laterally therefrom sufficiently to cut in a tooth space of the blank adjacent to the tooth space in which the said side-cutting tool operates, and rotating the gear blank continuously on its axis at a uniform velocity while imparting a reciprocatory movement at a varying velocity to the tools so that on each cutting stroke they engage the blank successively and cut along different parts of their paths of movement relative to the blank and so that on successive cutting strokes the tools enter different tooth spaces of the blank.

5. A machine for cutting gears in which cutting is effected by reciprocation of the tool mechanism across the face of a continuously rotating gear blank and in which the reciprocation of the tool mechanism is so timed to the rotation of the blank that a cut is taken in a different tooth space of the blank on each cutting stroke, a tool mechanism comprising a slide, a pair of tools mounted on the slide and spaced from one another in the direction of reciprocation of the slide to engage the same tooth space of the blank successively, one of said tools being adapted to cut one side surface of the teeth of the gear blank and the other the opposite sides of the teeth, and means for reciprocating the slide so that the tools will engage the blank successively on the strokes of the slide in one direction and will cut on each such cutting stroke along different parts of their respective paths of movement relative to the blank.

6. A machine for cutting gears in which cutting is effected by reciprocation of a tool mechanism across the face of a continuously rotating gear blank, in which the tool mechanism comprises a slide, three tools mounted on the slide, one of which is a slotting tool and the other two of which are side-cutting tools adapted to cut opposite side surfaces of the teeth of the gear blank, respectively, said side-cutting tools being spaced from one another in the direction of movement of the slide to engage opposite sides of the same tooth space of the blank successively, and said slotting tool being mounted along side of one of the side-cutting tools but laterally spaced therefrom to cut in a different tooth space of the gear blank from the said side-cutting tool, and means for reciprocating the slide in time with the blank rotation so that the side-cutting tools engage the blank successively on each cutting stroke of the slide and each of the tools enters a different tooth space of the blank on successive cutting strokes of the slide.

7. A machine for cutting gears in which cutting is effected by reciprocation of a tool mechanism across the face of a continuously rotating gear blank, and in which the tool mechanism comprises a slide having a pair of tool-receiving slots formed therein which are spaced from one another in the direction of reciprocation of the slide, two side-cutting tools, one of which is mounted in each of said slots, and a slotting tool which is mounted in one of said slots alongside of one of the side-cutting tools, means for adjusting the lateral positions of the several tools in their slots, means for laterally spacing the two tools which are mounted in one of the slots from one another, and means for reciprocating the slide.

8. A machine for cutting gears in which cutting is effected by reciprocating a tool mechanism across the face of a continuously rotating gear blank, and in which the tool mechanism comprises a slide, a pair of tools mounted on the slide so that one precedes the other in the direction of movement of the slide, one of the tools being adapted to cut one side of the teeth of the blank and the other tool being adapted to cut the opposite tooth sides, means for adjusting the tools laterally with relation to one another, a crank for reciprocating the slide and means for rotating the crank in time with the blank rotation.

ALLAN H. CANDEE.